(12) United States Patent
Vaddagiri (10) Patent No.: US 8,516,492 B2
(45) Date of Patent: Aug. 20, 2013

(54) SOFT PARTITIONS AND LOAD BALANCING

(75) Inventor: Srivatsa Vaddagiri, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 433 days.

(21) Appl. No.: 12/813,855

(22) Filed: Jun. 11, 2010

(65) Prior Publication Data

US 2011/0307903 A1    Dec. 15, 2011

(51) Int. Cl.
*G06F 9/46* (2006.01)
*G06F 11/00* (2006.01)

(52) U.S. Cl.
USPC ............ 718/105; 718/102; 714/13; 714/6.3

(58) Field of Classification Search
None
See application file for complete search history.

(56) References Cited

U.S. PATENT DOCUMENTS

| | | | |
|---|---|---|---|
| 6,289,369 B1 | 9/2001 | Sundaresan | |
| 6,658,449 B1 | 12/2003 | Brenner et al. | |
| 6,986,140 B2 | 1/2006 | Brenner et al. | |
| 6,993,762 B1 * | 1/2006 | Pierre | 718/102 |
| 7,178,145 B2 | 2/2007 | Bono | |
| 7,716,667 B2 * | 5/2010 | van Rietschote et al. | 718/1 |
| 8,145,820 B2 * | 3/2012 | Tanaka et al. | 710/267 |
| 2005/0125795 A1 * | 6/2005 | Kissell | 718/100 |
| 2006/0123423 A1 | 6/2006 | Brenner | |
| 2007/0300227 A1 * | 12/2007 | Mall et al. | 718/102 |
| 2008/0148105 A1 * | 6/2008 | Hisatomi et al. | 714/47 |
| 2012/0169253 A1 * | 7/2012 | Rolston | 315/297 |

OTHER PUBLICATIONS

Mike Kravetz, NUMA scheduling, http://lwn.net/2002/0228/a/mk-numa.php3.
Robin Holt, Re: [Quicklist 0/6] Arch independent quicklists V1, http://linux.derkeiler.com/Mailing-Lists/Kernel/2007-03/msg05149.html.
Andreas Merkel and Frank Bellosa, Balancing Power Consumption in Multiprocessor Systems, EuroSys'06, Apr. 18-21, 2006, Leuven, Belgium, pp. 403-414, http://www.cs.kuleuven.ac.be/conference/EuroSys2006/papers/p403-merkel.pdf.

* cited by examiner

*Primary Examiner* — Camquy Truong
(74) *Attorney, Agent, or Firm* — The Steadman Law Firm PLLC; Cynthia G. Seal (57) ABSTRACT

A method and system are provided for load balancing and partial task-processor binding. The method may provide for migrating at least one first task partially bound to and executing on at least one first processor. In accordance with the method, if at least one first condition is true, then the at least one first task may be migrated to at least one second processor such that the at least one second processor executes the at least one first task. Moreover, in accordance with the method, if at least one second condition is true, the at least one first task may be migrated back to the at least one first processor such that the at least one first processor executes the at least one first task.

14 Claims, 6 Drawing Sheets

SOFT PARTITIONS AND LOAD BALANCING

BACKGROUND

A task is a set of computer-executable instructions that process data. A task may read, manipulate, and/or write data. Traditionally, when a task is started, a thread is created to perform the task, and when the task has ended, the thread is terminated. A thread is the lowest-level execution of a set of instructions (i.e., the execution of a task), where a number of threads may be concurrently performed to execute a process of a computer program. A process may encompass one or more concurrently executing and/or non-concurrently executing threads. The terms "thread" and "task" are used interchangeably herein.

Tasks may be bound to processors or processor groups. Bound tasks are to be executed by the processors or processor groups to which they have been bound and are not to be executed by any other processors or processor groups. For example, a technique available in the kernel of the LINUX operating system known as Cpusets permits a thread to be bound to a processor or a set of processors. A task bound to a given Cpuset is executed by the processors assigned to the Cpuset and cannot be executed by any other processor that may be available.

While processor groups like Cpusets can provide for processor availability guarantees and some degree of processor load balancing, nevertheless they can result in poor processor utilization. For example, a first set of tasks may be bound to a first processor group, and a second set of tasks may be bound to a second processor group. The two processor groups may be non-overlapping, such that a processor belongs to one and only one of the two processor groups. The first set of tasks currently may be active, such that the processors of the first processor group are running at maximum utilization to execute the first set of tasks. By comparison, the second set of tasks currently may be inactive, such that the processors of the second processor group are currently idle. However, since the first set of tasks is bound to the first processor group, the idle processors of the second processor group cannot be used to execute the first set of tasks.

A partial solution is provided within the known art in that tasks can be migrated from one processor group to another processor group. In accordance with such partial solution, a task initially may be bound to a first processor group. Then, the task may be migrated from the first processor group to a second processor group. As a result of such migration, the task is executed by the processors of the second processor group and not by any processor that is not within this second processor group. However, once the task has been migrated from the first processor group to the second processor group, it no longer has any residual binding or other relationship with respect to the first processor group.

Furthermore, in accordance with the known art, the user has no preferential control over the processor groups to which a task is migrated. For example, consider a large university server having the following processor groups: math/professors, math/students, physics/professors, and physics/students. These groups are allocated to professors of the math department, students of the math department, professors of the physics department, and students of the physics department, respectively. It is desired that when migrating a task from the math/professors processor group, the task is first migrated to the math/students processor group, followed by to the physics/students processor group, and finally to the physics/professors processor group. However, the known art does not provide any control over the order in which such task migration is attempted.

Furthermore, the known art does not provide a mechanism to specify thresholds for load balancing. For example, it may be desirable to specify that the physics/professor group can accept foreign tasks (i.e., tasks belong to other processor groups) only when it has more than 50% idle time. However, the known art does not provide for such specifications.

SUMMARY

The various embodiments described herein relate generally to a method and system for load balancing and partial task-processor binding. The various embodiments provide improvements over the known art with respect to processor utilization and task migration.

In accordance with a first aspect of the various embodiments, a method is provided for migrating, at least temporarily, at least one first task partially bound to and executing on at least one first processor. In accordance with the method, if at least one first condition is true, then the at least one first task may be migrated to at least one second processor such that the at least one second processor executes the at least one first task. Moreover, in accordance with the method, if at least one second condition is true, then the at least one first task may be migrated back to the at least one first processor such that the at least one first processor again executes the at least one first task.

The at least one first condition may comprise a condition in which a native task utilization rate with respect to second tasks partially bound to and executing on the at least one second processor is less than a first threshold. Additionally, the at least one first condition may comprise a condition in which a native task utilization rate with respect to first tasks partially bound to and executing on the at least one first processor is greater than a second threshold. The at least one second condition may comprise a condition in which a native task utilization rate with respect to second tasks partially bound to and executing on the at least one second processor is greater than a third threshold. In addition, the at least one second condition may comprise a condition in which a native task utilization rate with respect to first tasks partially bound to and executing on the at least one first processor is less than a fourth threshold. Furthermore, the at least one second condition may comprise a condition in which a foreign task utilization rate with respect to the at least one first task migrated to and executing on the at least one second processor is less than a fifth threshold.

In accordance with a second aspect of the various embodiments described herein, a system is provided. The system may comprise a plurality of processor groups, and each processor group may comprise at least one processor. Moreover, the system may comprise a computer-readable medium that may store task lists for each processor group. More specifically, the computer-readable medium may store for each processor group a list of native tasks, wherein each native task may be partially bound to the processor group such that by default the at least one processor of the processor group executes the native task. Moreover, the computer-readable medium may store for each processor group a list of foreign tasks, wherein each foreign task may be partially bound to a different processor group but at least temporarily migrated to the processor group such that the at least one processor of the processor group at least temporarily executes the foreign task. Furthermore, the computer-readable medium may store for each processor group a list of migrated tasks, wherein each migrated task may be partially bound to the processor group but at least temporarily migrated to a different processor group such that the at least one processor of the different processor group at least temporarily executes the migrated task.

According to an embodiment, the system may comprise a load-balancing mechanism, and such load-balancing mechanism may migrate at least one task from a second processor group among the plurality of processor groups to a first processor group among the plurality of processor groups if the first processor group has a native task utilization rate that is less than a first threshold. The at least one task migrated from the second processor group to the first processor group may be a native task of the second processor group and may be a foreign task of the first processor group. Upon the migration, the load-balancing mechanism may add the at least one migrated task to the list of foreign tasks of the first processor group, may add the at least one migrated task to the list of migrated tasks of the second processor group, and may remove the at least one migrated task from the list of native tasks of the second processor group.

According to another embodiment, the system may comprise a load-balancing mechanism, and such load-balancing mechanism may migrate at least one task from a first processor group among the plurality of processor groups to a second processor group among the plurality of processor groups if the first processor group has a foreign task utilization rate that is less than a second threshold. The at least one task migrated from the first processor group to the second processor group may be a native task of the second processor group and may be a foreign task of the first processor group. Upon the migration, the load-balancing mechanism may remove the at least one migrated task from the list of foreign tasks of the first processor group, may remove the at least one migrated task from the list of migrated tasks of the second processor group, and may add the at least one migrated task to the list of native tasks of the second processor group.

In accordance with a third aspect of the various embodiments described herein, a method for task-pulling load balancing is provided. The method may comprise determining whether a first task utilization rate with respect to at least one first task executing on at least one first processor is less than a first threshold. The at least one first task may be partially bound to the at least one first processor. In response to determining that the first task utilization rate is less than the first threshold, the method further may comprise migrating at least one second task from at least one second processor to the at least one first processor such that the at least one first processor executes the at least one second task. Moreover, in response to determining that the first task utilization rate is less than the first threshold, and prior to migrating the at least one second task from the at least one second processor to the at least one first processor, the method may comprise selecting the at least one second task to migrate from the at least one second processor to the at least one first processor.

If there is at least one task partially bound to the at least one first processor that is currently migrated away from the at least one first processor, then selecting the at least one second task to migrate from the at least one second processor to the at least one first processor may comprise selecting the at least one task partially bound to the at least one first processor that is currently migrated away from the at least one first processor. Moreover, if there is no task partially bound to the at least one first processor that is currently migrated away from the at least one first processor, and if there is a user-defined migration order, then selecting the at least one second task may comprise selecting at least one task in accordance with the user-defined migration order. Furthermore, if there is no task partially bound to the at least one first processor that is currently migrated away from the at least one first processor, and if there is no user-defined migration order, then selecting the at least one second task may comprise selecting at least one task from at least one processor having a highest native task utilization rate that is greater than a second threshold. In accordance with the method, the at least one second task may be partially bound to the at least one second processor.

In accordance with a fourth aspect of the various embodiments described herein, a method for task-pushing load balancing is provided. The method may comprise determining whether a second task utilization rate with respect to at least one second task executing on at least one first processor is less than a threshold. The at least one first processor may have at least one first task partially bound thereto, and the at least one second task may have been migrated to the at least one first processor but not be partially bound thereto. In response to determining that the second task utilization rate is less than the threshold, the method further may comprise migrating the at least one second task from the at least one first processor to at least one second processor such that the at least one second processor executes the at least one second task. Furthermore, in response to determining that the second task utilization rate is less than the threshold, and prior to migrating the at least one second task from the at least one first processor to the at least one second processor, the method may comprise selecting the at least one second task to migrate from the at least one first processor to the at least one second processor.

If there is a user-defined migration order, then selecting the at least one second task to migrate from the at least one first processor to the at least one second processor may comprise selecting at least one task in accordance with an order in reverse to the user-defined migration order. Conversely, if there is no user-defined migration order, then selecting the at least one second task may comprise selecting at least one task that is not among the at least one first task and that is partially bound to at least one processor having a lowest native task utilization rate. In accordance with the method, the at least one second task may be partially bound to the at least one second processor.

In accordance with a fifth aspect of the various embodiments described herein, a method is provided for balancing tasks among a plurality of processors. The method may comprise identifying a plurality of tasks among a first set of tasks to be migrated from a first processor among the plurality of processors to a second processor among the plurality of processors. The method further may comprise migrating the plurality of tasks to the second processor. In accordance with the method, the second processor may be configured to process a second set of tasks in addition to the migrated plurality of tasks.

Additionally, the method may comprise monitoring the first set of tasks present at the first processor. Upon determining that processing with respect to the first set of tasks present at the first processor has arrived at a first threshold, the method further may comprise identifying transferable tasks among the migrated plurality of tasks and migrating such transferable tasks away from the second processor. Migrating the transferable tasks away from the second processor in accordance with the method may comprise performing at least one of (i) migrating the transferable tasks back to the first processor and (ii) identifying at least one other processor wherein processing with respect to tasks handled by the at least one other processor is less than the first threshold, and migrating the transferable tasks from the second processor to the at least one other processor. Identifying transferable tasks among the migrated plurality of tasks in accordance with the method may comprise monitoring the migrated plurality of tasks present at the second processor, determining tasks among the migrated plurality of tasks yet to be processed, and designating the tasks yet to be processed as transferable tasks if the tasks yet to be processed are not processed by a time indicated by a second threshold.

As indicated above and as will be further discussed herein, the various embodiments introduce a "soft partitioning" concept. In accordance with such soft partitioning concept, a task may be partially bound to a processor or processor group and thus may be executed by default by such processor or processor group, but such task also may be migrated to another processor or processor group for execution if such migration is appropriate or necessary in terms of processor utilization and/or load balancing. That is to say, in accordance with the various embodiments, there may be partitions among processors or processor groups, but such partitions may be soft rather than rigid, and accordingly tasks may be (at least temporarily) migrated in order to facilitate processor utilization and/or load balancing within a system. However, unlike as in the known art, a task that has been migrated to another processor or processor group may remain partially bound to its default processor or processor group and accordingly there may remain a connection or relationship between the task and the default processor or processor group to which it is partially bound. That is to say, in accordance with the various embodiments, the partial binding relationship between a task and a processor or processor group may be preserved when the task is migrated to a different processor or processor group.

BRIEF DESCRIPTION OF THE DRAWINGS

The above and other objects, features, and advantages of the various embodiments are to be described in further detail herein with reference to the attached drawings, in which.

Features shown in the drawings are meant as illustrative of exemplary embodiments only and do not encompass all embodiments. Implications to the contrary are not to be made.

DETAILED DESCRIPTION

Where reference is made in any one or more of the accompanying drawings to steps and/or features that have the same reference numerals, those steps and/or features have, for purposes of this description, the same function(s) or operation(s), unless the contrary intention appears.

Figure 1:
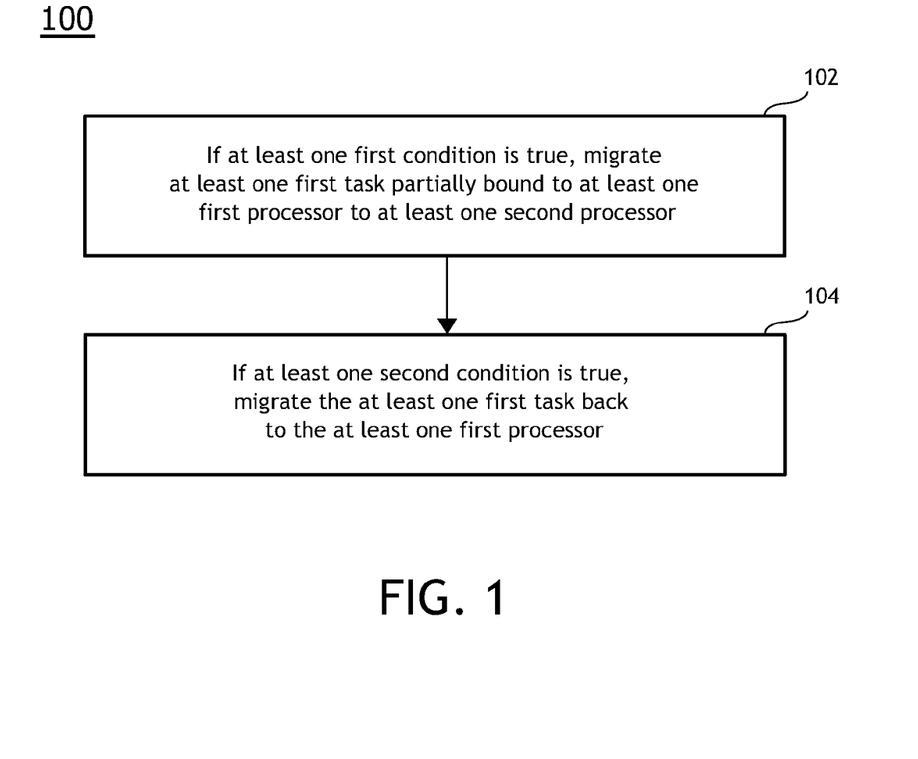
FIG. 1 provides a flowchart of a migration method in accordance with an exemplary embodiment.

FIG. 1 shows a method 100 for migrating tasks in accordance with an exemplary embodiment. Migrating tasks based on task utilization rates may be best in terms of processor performance and/or load balancing. In accordance with the method 100, if at least one first condition is or becomes true, then at least one first task partially bound and executing on at least one first processor may be migrated, at least temporarily, to at least one second processor such that the at least one second processor executes the at least one first task at least temporarily (step 102). However, the at least one first task is not said to be bound—or even partially bound—to the at least one second processor.

The at least one first condition with respect to step 102 of the method 100 may include a condition in which a native task utilization rate with respect to second tasks partially bound to and executing on the at least one second processor is less than a first threshold. The native task utilization rate with respect to tasks executing on processors refers to the utilization rate with respect to tasks that are partially bound to the processors. Since the second tasks are partially bound to the at least one second processor, the second tasks are native to the at least one second processor. When the native task utilization rate with respect to second tasks executing on the at least one second processor is less than the first threshold, the at least one second processor may have the capability to efficiently handle additional tasks, and thus it may be best in terms of processor performance and/or load balancing to migrate at least one first task from the at least one first processor to the at least one second processor in accordance with step 102.

Moreover, the at least one first condition may comprise a condition in which a native task utilization rate with respect to first tasks partially bound to and executing on the at least one first processor is greater than a second threshold. In such case, the at least one first processor may not have the capability to efficiently handle all of the first tasks, and thus it may be best in terms of processor performance and/or load balancing to migrate at least one first task away from the at least one first processor to the at least one second processor in accordance with step 102.

It is noted that the first and second thresholds with respect to the first conditions discussed above may be determined in accordance with user preferences. More specifically, the first and second thresholds with respect to the first conditions may be user-defined and/or user-adjustable. Moreover, the first and second thresholds with respect to the first conditions may be the same. Alternatively, the first and second thresholds with respect to the first conditions may be different.

Furthermore, in accordance with the method 100, if at least one second condition is or becomes true, then the at least one first task migrated to the at least one second processor in accordance with step 102 may be migrated back to the at least one first processor such that the at least one first processor again executes the at least one first task (step 104). It is noted that the at least one first task may remain partially bound to the at least one first processor even after being migrated to the at least one second processor and even when being executed by the at least one second processor.

The at least one second condition may comprise a condition in which a native task utilization rate with respect to second tasks executing on the at least one second processor is greater than a third threshold. When the native task utilization rate with respect to second tasks executing on the at least one second processor is greater than the third threshold, the at least one second processor may no longer have the capability to efficiently execute the at least one first task migrated to the at least one second processor in step 102, and thus it may be best in terms of processor performance and/or load balancing to migrate the at least one first task back to the at least one first processor in accordance with step 104.

Moreover, the at least one second condition may comprise a condition in which a native task utilization rate with respect to first tasks executing on the at least one first processor is less than a fourth threshold. When the native task utilization rate with respect to first tasks partially bound to and executing on the at least one first processor is less than the fourth threshold, the at least one first processor may have the capability to efficiently handle additional tasks, and thus it may be best in terms of processor performance and/or load balancing to migrate the at least one first task back to the at least one first processor in accordance with step 104.

Furthermore, the at least one second condition with respect to step 104 of the method 100 may comprise a condition in which a foreign task utilization rate with respect to the at least one first task migrated to and executing on the at least one second processor is less than a fifth threshold. The foreign task utilization rate is the utilization rate with respect to tasks executing on processors to which the tasks are not partially bound (i.e., processors to which the tasks have been migrated). Since the at least one first task migrated to the at least one second processor is not partially bound to the at least one second processor, the at least one first task is foreign to the at least one second processor. Since native tasks may be executed before foreign tasks, there is a possibility that foreign tasks will not be efficiently handled. Accordingly, when the foreign task utilization rate with respect to the at least one first task migrated to and executing on the at least one second processor is less than the fifth threshold, the at least one first task may not be efficiently executed on the at least one second processor, and thus it may be best in terms of processor performance and/or load balancing to migrate the at least one first task back to the at least one first processor in accordance with step 104.

It is noted that the third, fourth, and fifth thresholds with respect to the second conditions discussed above may be determined in accordance with user preferences. More specifically, the third, fourth, and fifth thresholds may be user-defined and/or user-adjustable. Furthermore, one or more of the third, fourth, and fifth thresholds may be the same. Alternatively, the third, fourth, and fifth thresholds may be different from one another. Additionally, one or more of the third, fourth, and fifth thresholds with respect to the second conditions may be the same as one or more of the aforementioned first and second thresholds with respect to the first conditions.

In this way, the method 100 may provide for partial binding of a task to a processor. A task may be partially bound to the processor such that by default the processor is to execute the task. However, the task nevertheless may be migrated, at least temporarily, to a different processor for execution by such different processor. Even when migrated to such different processor, the task may remain partially bound to the original processor. Thus, the task may be easily migrated back to the original processor as necessary.

Figure 2:
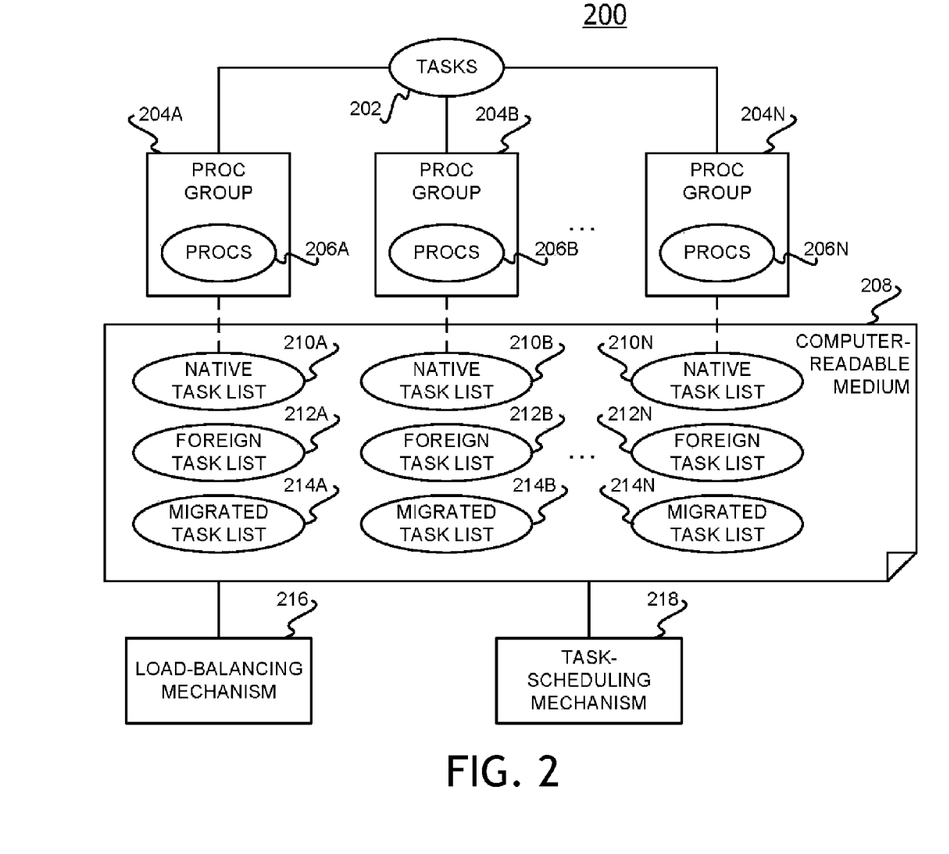
FIG. 2 provides a diagram of a system in accordance with an exemplary embodiment.

Reference is now made to FIG. 2, which shows a system 200 in accordance with an exemplary embodiment. The system 200 may include or may be operable in relation to a plurality of tasks 202. The system 200 may comprise a plurality of processor groups 204A, 204B, . . . 204N, collectively referred to as the processor groups 204. The processor groups 204 each may comprise one or more processors 206A, 206B, . . . 206N, collectively referred to as the processors 206. Thus, the processors 206A may be assigned to the processor group 204A, the processors 206B may be assigned to the processor group 204B, and the processors 206N may be assigned to the processor group 204N. It is noted that the processor groups 204 may be mutually exclusive; that is, a given processor can belong to one and only one processor group.

The tasks 202 may include hard-bound tasks, partially bound tasks, and unbound tasks. Hard-bound tasks are tasks that are hard-bound to one of the processor groups 204, in accordance with the known art. Thus, a task that has been hard-bound to a given processor group can be executed only by the processors of that processor group and thus cannot be executed by the processors of any other processor group.

Partially bound tasks are tasks that are partially bound to one of the processor groups 204. A task that has been partially bound to a given processor group is by default executed by the processors of that group. However, such a task may be temporarily migrated to a different processor group for (at least temporary) execution by the processors of the different processor group. If such a task is temporarily migrated from the original processor group (to which it is partially bound) to a different processor group, it retains its partial binding to the original processor group, but is not said to be bound—partially or otherwise—to the different processor group. Finally, unbound tasks are tasks that are not partially or hard-bound to any of the processor groups 204.

The system 200 may comprise a computer-readable medium 208. The computer-readable medium 208 may be a semiconductor memory or another type of tangible computer-readable medium. The computer-readable medium 208 may actually encompass a number of computer-readable media, one for each processor group 204. For instance, such computer-readable media may be part of the processors 206.

The computer-readable medium 208 may store a number of different lists for each of the processor groups 204. First, the computer-readable medium 208 may store native task lists 210A, 210B, . . . 210N, collectively referred to as the native task lists 210, for the processor groups 204. The native task lists 210 may list the tasks that have been partially bound to the processor groups 204, such that these tasks are said to be native to the processor groups 204. For example, the native task list 210A may list the tasks that have been partially bound to the processor group 204A, the native task list 210B may list the tasks that have been partially bound to the processor group 204B, and the native task list 210N may list the tasks that have been partially bound to the processor group 204N.

Second, the computer-readable medium 208 may store foreign task lists 212A, 212B, . . . 212N, collectively referred to as the foreign tasks lists 212, for the processor groups 204. The foreign task lists 212 may list the tasks that have been at least temporarily migrated to the processor groups 204 for at least temporary execution by their processors 206, but that have not been partially or hard-bound to the processor groups 204, such that these tasks are said to be foreign to the processor groups 204. For example, the foreign task list 212A may list the tasks that have been at least temporarily migrated to the processor group 204A for at least temporary execution by the processors 206A, and the foreign task list 212B may list the tasks that have been at least temporarily migrated to the processor group 204B for at least temporary execution by the processors 206B. Likewise, the foreign task list 204N may list the tasks that have been at least temporarily migrated to the processor group 204N for at least temporary execution by the processors 206N.

Third, the computer-readable medium 208 may store migrated task lists 214A, 214B, . . . 214N, collectively referred to as the migrated task lists 214, for the processor groups 204. The migrated task lists 214 may list the tasks that have been partially bound to the processor groups 204 but that have been at least temporarily migrated away from the processor groups 204 for at least temporary execution. For example, the migrated task list 214A may list the native tasks of the processor group 204A that have been at least temporarily migrated away from the processor group 204A for at least temporary execution by processors other than the processors 206A, and the migrated task list 214B may list the native tasks of the processor group 204B that have been at least temporarily migrated away from the processor group 204B for at least temporary execution by processors other than the processors 206B. Likewise, the migrated task list 214N may list the native tasks of the processor group 204N that have been at least temporarily migrated away from the processor group 204N for at least temporary execution by processors other than the processors 206N.

In accordance with an embodiment, it is noted that the tasks listed in the migrated task list for a given processor group are not listed in the native task list for the given processor group (i.e., a task partially bound to a given processor group is listed in the native task list for that processor group only if it is not migrated to another processor group). Furthermore, it is noted that the tasks listed in the foreign task list for a given processor group by definition are not listed in either the native task list or the migrated task list for that given processor group. Stated another way, the migrated task list and the native task list are mutually exclusive, the foreign task list and the native task list are mutually exclusive, and the foreign task list and the migrated task list are mutually exclusive. For example, by definition none of the tasks within the foreign task list 212A can be listed in the native task list 210A or the migrated task list 214A; that is to say, the foreign task list 212A and the native task list 210A are mutually exclusive, and the foreign task list 212A and the migrated task list 214A are mutually exclusive.

The system 200 also may comprise a load-balancing mechanism 216. The load-balancing mechanism 216 may be implemented in software, hardware, or a combination of software and hardware. There may be a number of load-balancing mechanisms 216 corresponding to the number of processor groups 204. Alternatively, a single load-balancing mechanism 216 may be operable for all of or each of the processor groups 204. The load-balancing mechanism 216 generally may be responsible for at least temporarily migrating tasks among the processor groups 204. Moreover, the system 200 may comprise a task-scheduling mechanism 218 that may facilitate task scheduling among the processor groups 204. The task-scheduling mechanism 218 may be implemented in software, hardware, or a combination of software and hardware. Furthermore, the system 200 may perform other functionality and/or include other mechanisms, groups, and lists, such as user-specified migration groups and migration-order lists, as described further herein.

Figure 3:
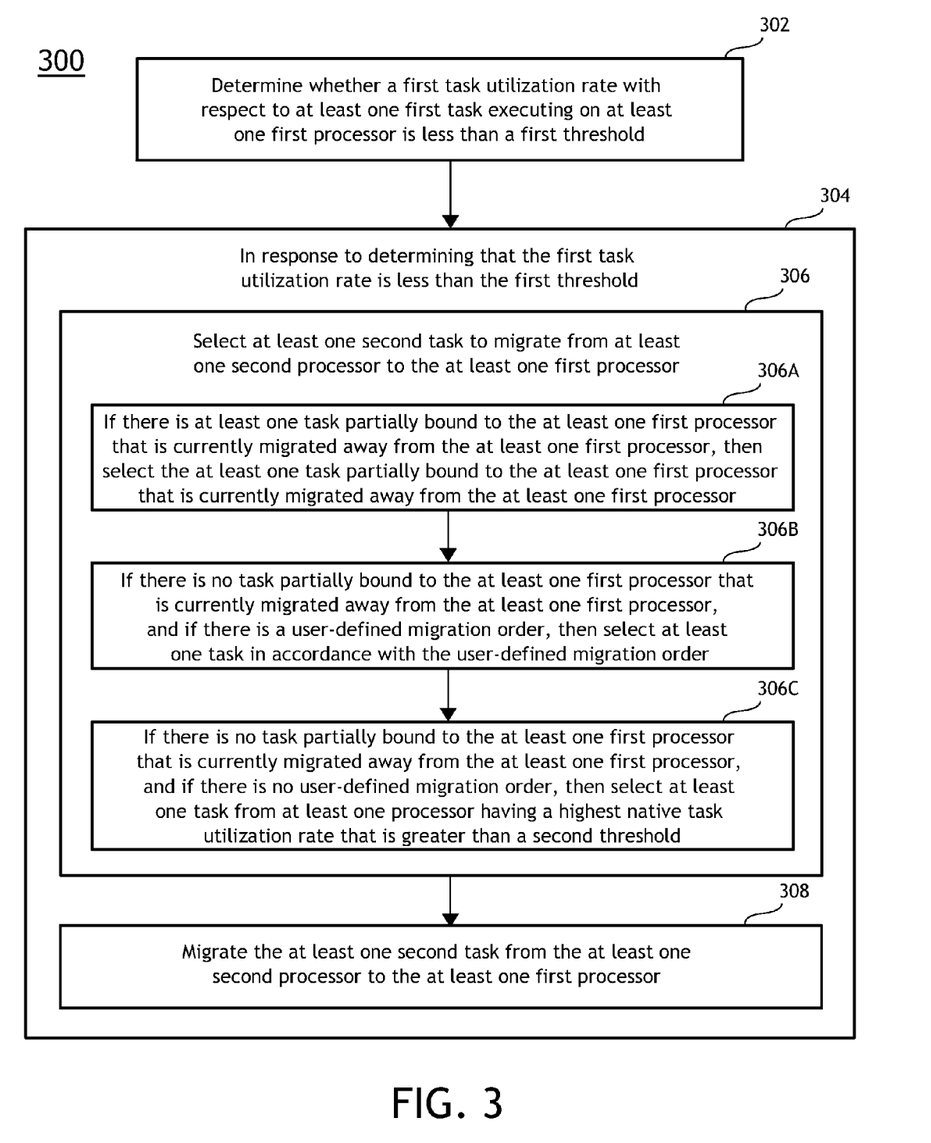
FIG. 3 provides a flowchart of a method for task-pulling load balancing in accordance with an exemplary embodiment.

Reference is now made to FIG. 3, which shows a method 300 for pulling tasks from at least one second processor in order to migrate such tasks from the at least one second processor to at least one first processor, in accordance with an exemplary embodiment. The method 300 may be used for purposes of load balancing among the processor groups 204. More specifically, the method 300 may be periodically performed for each of the processor groups 204 via the load-balancing mechanism 216. The at least one first processor of the method 300 may correspond to one of the processor groups 204, and the at least one second processor of the method 300 may correspond to another of the processor groups 204.

In accordance with the method 300, initially the at least one first processor may be executing at least one first task. The at least one first task may be partially bound (i.e., native) to the at least one first processor such that by default the at least one first processor executes the at least one first task. It may be determined whether a first task utilization rate with respect to the at least one first task executing on the at least one first processor is less than a first threshold (step 302). More specifically, the first task utilization rate may be a native task utilization rate with respect to the at least one first task (i.e., native task) executing on the at least one first processor. In accordance with an embodiment, the first threshold with respect to the first task utilization rate may be user-defined and/or user-adjustable.

In response to determining that the first task utilization rate is less than the first threshold (304), at least one second task executing on the at least one second processor may be selected to migrate from the at least one second processor to the at least one first processor for execution by the at least one first processor (step 306).

Selection of the at least one second task may be performed as follows. If there is at least one task partially bound to the at least one first processor that is currently migrated away from the at least one first processor (i.e., if there is at least one task native to the at least one first processor that is currently migrated away from the at least one first processor), then the at least one task partially bound to the at least one first processor that is currently migrated away from the at least one first processor may be selected as the at least one second task to migrate to the at least one first processor (step 306A). For example, in accordance with step 306A, tasks that are partially bound to processor group 204A but are currently migrated away from processor group 204A may be migrated back to processor group 204A.

If there is no task partially bound to the at least one first processor that is currently migrated away from the at least one first processor, and if there is a user-defined migration order, then at least one task in accordance with the user-defined migration order may be selected as the at least one second task to migrate to the at least one first processor (step 306B). The migration order may pertain to processor groups; for instance, a migration order property of processor group 204A may be processor group 204C followed by processor group 204B, meaning that tasks should first be pulled from processor group 204C and then from processor group 204B. Therefore, in accordance with step 306B, tasks from processor group 204C should be pulled first in accordance with the user-defined migration order, followed by tasks from processor group 204C as appropriate.

If there is no task partially bound to the at least one first processor that is currently migrated away from the at least one first processor, and if there is no user-defined migration order, then at least one task from at least one processor having a highest native task utilization rate that is greater than a second threshold may be selected as the at least one second task to migrate to the at least one first processor (step 306C). For example, if the native task utilization rate with respect to the native tasks executing on the processors 206C of processor group 204C is highest among the processor groups 204, and if additionally such native task utilization rate is greater than the second threshold, then it may be best in terms of processor performance and/or load balancing to pull tasks from the processor group 204C. Thus, in accordance with step 306C, tasks should be pulled first from the processor group 204C. In accordance with an embodiment, the second threshold with respect to the native task utilization rate used in step 306C may be user-defined and/or user-adjustable. Moreover, it is noted that the second threshold with respect to step 306C may be the same as the first threshold with respect to step 302. Alternatively, the second threshold with respect to step 306C may be different from the first threshold with respect to step 302.

Once the at least one second task has been selected, the at least one second task may be migrated from the at least one second processor to the at least one first processor for execution by the at least one first processor (step 308). In the event that the at least one second task is a native task of the at least one first processor, upon migration the at least one second task may be removed from the migrated task list associated with the at least one first processor, may be added to the native task list associated with the at least one first processor, and may be removed from the foreign task list associated with the at least one second processor. On the other hand, in accordance with an embodiment, the at least one second task processed in accordance with the method 300 may be partially bound (i.e., native) to the at least one second processor such that by default the at least one second processor executes the at least one second task. In the event that the at least one second task is a native task of the at least one second processor, upon migration the at least one second task may be added to the foreign task list associated with the at least one first processor, may be added to the migrated task list associated with the at least one second processor, and may be removed from the native task list associated with the at least one second processor.

Figure 4:
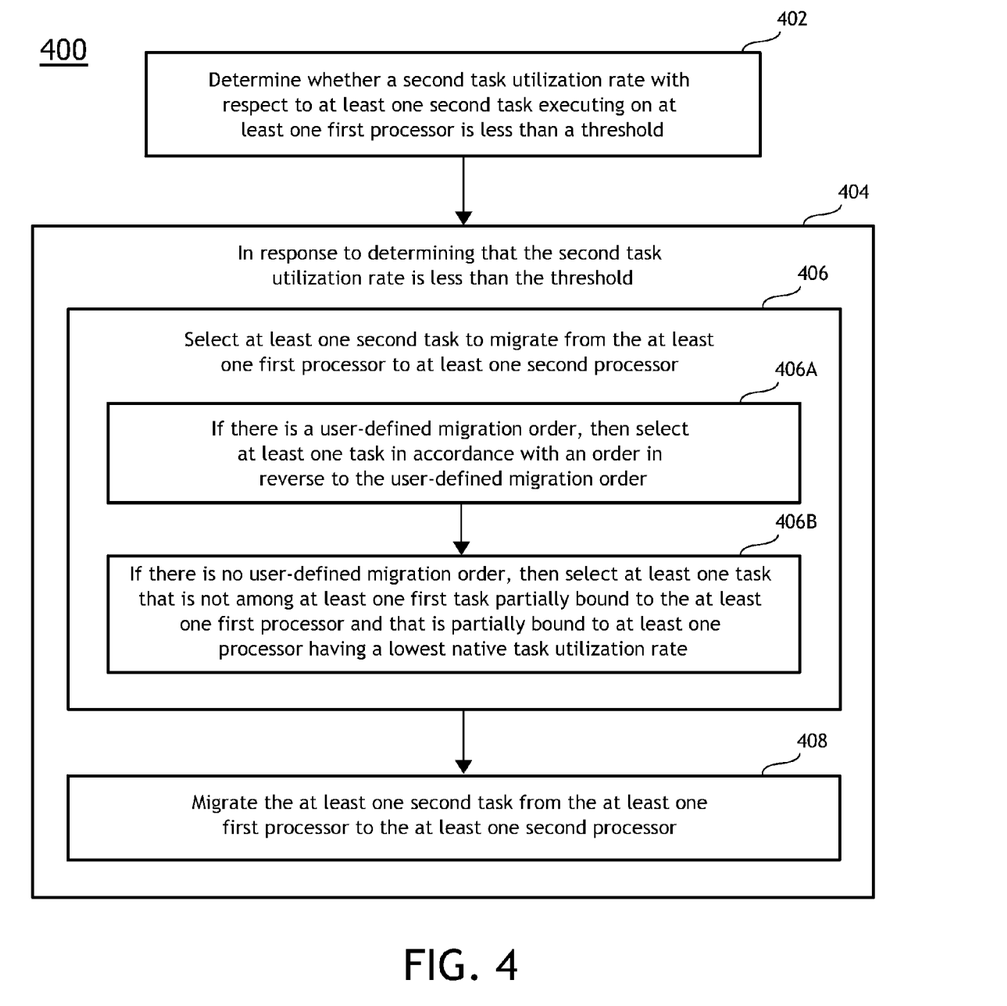
FIG. 4 provides a flowchart of a method for task-pushing load balancing in accordance with an exemplary embodiment.

Reference is now made to FIG. 4, which shows a method 400 for pushing tasks from at least one first processor in order to migrate such tasks from the at least one first processor to at least one second processor, in accordance with an exemplary embodiment. The method 400 may be used for purposes of load balancing among the processor groups 204. More specifically, the method 400 may be periodically performed for each of the processor groups 204 via the load-balancing mechanism 216. The at least one first processor of the method 400 may correspond to one of the processor groups 204, and the at least one second processor of the method 400 may correspond to another of the processor groups 204.

In accordance with the method 400, initially the at least one first processor may be executing at least one first task. The at least one first task may be a native task that is partially bound to the at least one first processor such that by default the at least one first processor executes the at least one first task. Moreover, initially the at least one first processor may be executing at least one second task, which may be a non-native, foreign task that is not partially bound to the at least one first processor. It may be determined whether a second task utilization rate with respect to the at least one second task executing on the at least one first processor is less than a threshold (step 402). More specifically, the second task utilization rate may be the utilization rate of the at least one first processor in executing the at least one second task not partially bound (i.e., foreign) to the at least one first processor. Accordingly, the second task utilization rate may be a foreign task utilization rate with respect to the at least one second task (i.e., foreign task) executing on the at least one first processor. The threshold may be user-defined and/or user-adjustable. Moreover, the threshold may be the same as the first threshold used in the method 300 with respect to the first task utilization rate. Alternatively, the threshold may be different from the first threshold used in the method 300 with respect to the first task utilization rate.

In response to determining in step 402 that the second task utilization rate is less than the threshold (404), at least one second task executing on the at least one first processor may be selected to migrate from the at least one first processor to the at least one second processor (i.e., at least one processor other than the at least one first processor) for execution by the at least one second processor (step 406).

Selection of the at least one second task may be performed as follows. If there is a user-defined migration order, then at least one task in accordance with an order in reverse to the user-defined migration order may be selected as the at least one second task to migrate to the at least one second processor (step 406A). For example, assume that the migration order for processor group 204A is processor group 204B, followed by processor group 204C, and so on. Thus, when the processor group 204A is ready to pull tasks, in accordance with the migration order, the processor group 204A first may attempt to pull tasks that are partially bound to processor group 204B, followed by tasks that are partially bound to processor group 204C, and so on. Now, assume that processor group 204A has pulled some tasks from processor group 204B first, followed by pulling some tasks from processor group 204C. Thereafter it may be determined in accordance with step 402 that the second task utilization rate with respect to processor group 204A (i.e., the amount of time spent by processors 206A of processor group 204A in executing the tasks of processor groups 204B and/or 204C) is less than a threshold, and thus the tasks of processor groups 204B and 204C are potentially starving (i.e., not being adequately handled), as they may not be receiving the processor cycles needed for execution. In such case, in accordance with step 406A, the tasks of processor groups 204B and 204C may be pushed from the processor group 204A in reverse order of the migration order, such that the tasks of processor group 204C may be pushed first, and the tasks of processor group 204B subsequently may be pushed as appropriate.

However, if there is no user-defined migration order, then at least one task that is not among the at least one first task (i.e., that is not partially bound to the at least one first processor) and that is partially bound (i.e., native) to at least one processor having the lowest native task utilization rate may be selected as the at least one second task to migrate to the at least one second processor (step 406B). For example, assume again that the processor group 204A has pulled tasks from processor groups 204B and 204C. When in step 402 it is determined the second task utilization rate is less than a threshold (i.e., it is determined that the foreign tasks of processor groups 204B and/or 204C are not being adequately handled), the tasks of processor groups 204B and 204C may be pushed from processor group 204A, and thus at least one task among processor groups 204B and 204C may be selected for migration in accordance with step 406. If in such case it is determined that there is no user-defined migration order, then the at least one task may be selected in accordance with step 406B, and accordingly the native task utilization rates with respect to processor groups 204B and 204C may be determined. For example, the native task utilization rate of processor group 204B is the amount of time spent by processors 206B of processor group 204B in executing tasks that are native (i.e., partially bound) to processor group 204B. If the native task utilization rate of processor group 204B is less than that of processor group 204C, then tasks belonging to processor group 204B may be pushed first from processor group 204A, and tasks belonging to processor group 204C subsequently may be pushed from processor group 204A as appropriate.

Once the at least one second task has been selected, the at least one second task may be migrated from the at least one first processor to the at least one second processor for execution by the at least one second processor (step 408). It is noted that the at least one second task processed in accordance with the method 400 may be partially bound to the at least one second processor such that by default the at least one second processor executes the at least one second task. In such case, upon migration the at least one second task may be removed from the foreign task list associated with the at least one first processor, may be removed from the migrated task list associated with the at least one second processor, and may be added to the native task list associated with the at least one second processor.

Figure 5:
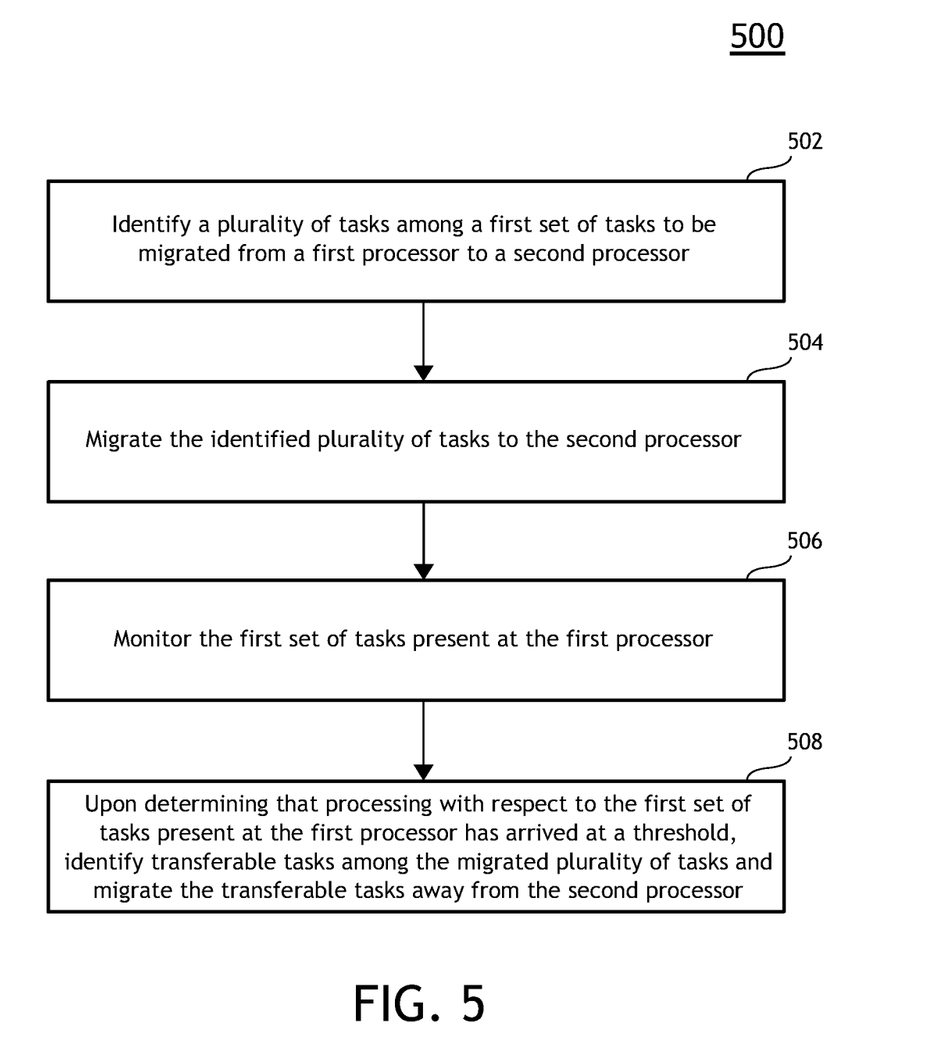
FIG. 5 provides a method for balancing tasks among a plurality of processors in accordance with an exemplary embodiment.

Reference is now made to FIG. 5, which shows a method 500 for balancing tasks in accordance with an exemplary embodiment. The method 500 may involve a first processor and a second processor. The first processor may be among processors 206 of one of the processor groups 204, and the second processor may be among processors 206 of another one of the processor groups 204.

In accordance with the method 500, a plurality of tasks among a first set of tasks may be identified so that the plurality of tasks may be migrated from the first processor to the second processor (step 502). Then, the identified plurality of tasks may be migrated to the second processor (step 504). Migration of one or more tasks among the first set of tasks to another processor may be best in terms of processor efficiency and/or load balancing. The second processor may be configured to process a second set of tasks as well as the migrated plurality of tasks from the first processor. Moreover, the migrated plurality of tasks may be migrated back to the first processor or may be migrated to another processor, as further described below.

Subsequently, the first set of tasks still present at the first processor following migration of the aforementioned plurality of tasks may be monitored (step 506). Upon determining that processing with respect to the first set of tasks still present at the first processor has arrived at a first threshold, transferable tasks among the migrated plurality of tasks (migrated from the first processor to the second processor in step 504) may be identified, and the transferable tasks may be migrated away from the second processor (step 508). Migrating the transferable tasks away from the second processor may comprise at least one of the following actions: (i) migration of the transferable tasks back to the first processor and (ii) identification of at least one other processor wherein processing with respect to tasks handled by the at least one other processor is less than the first threshold, and migration of the transferable tasks from the second processor to the at least one other processor. The first threshold may be user-defined and/or user-adjustable.

For example, in accordance with step 508 of the method 500, if it is determined that processing with respect to the first set of tasks executing on the first processor has decreased to the first threshold, it may be best in terms of processor efficiency and/or load balancing to transfer transferable tasks (i.e., some or all of the plurality of tasks that were migrated in step 504) back to the first processor or to at least one other processor with processing activity less than the first threshold.

The transferable tasks may be identified by monitoring the migrated plurality of tasks (migrated to the second processor in step 504), determining tasks among the migrated plurality of tasks yet to be processed, and designing such tasks yet to be processed as transferable tasks if the tasks yet to be processed are not processed by a certain time. Such time may be indicated by a second threshold.

Figure 6:
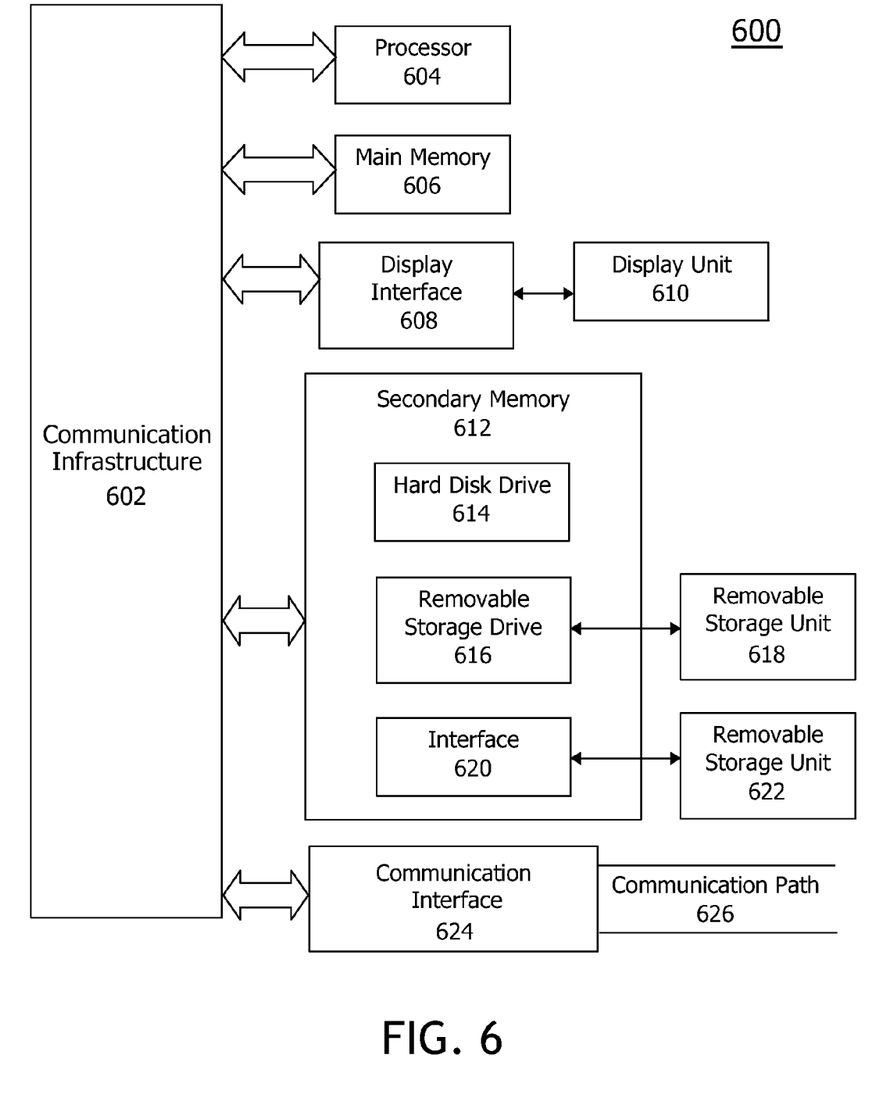
FIG. 6 provides a data processing system in which the exemplary embodiments illustrated in FIGS. 1 to 5 may be implemented, in accordance with an exemplary embodiment.

FIG. 6 illustrates a block diagram of a data processing system 600 in accordance with an exemplary embodiment. The data processing system 600 may be a computing system such as a desktop computer, laptop computer, PDA, mobile phone, and the like. The data processing system 600 may be used for implementing exemplary embodiments as described with reference to FIGS. 1 to 5. The data processing system 600 may comprise one or more processors, for example processor 604 as illustrated in FIG. 6. Processor 604 may be coupled to a communication infrastructure 602 (e.g., a communications bus, cross-over bar, or network).

The data processing system 600 further may comprise display interface 608 that may forward graphics, text, and other data from the communication infrastructure 602 (or from a frame buffer not shown) for display on display unit 610. Additionally, the data processing system 600 may comprise main memory 606 (e.g., random access memory (RAM)) and may also comprise secondary memory 612. Secondary memory 612 may comprise, for example, hard disk drive 614 and/or removable storage drive 616 (e.g., a floppy disk drive, a magnetic tape drive, an optical disk drive, etc.). Removable storage drive 616 may read from and/or write to removable storage unit 618 in a manner well known to those having ordinary skill in the art. Removable storage unit 618, (e.g., a floppy disk, magnetic tape, optical disk, etc.) may be read by and written to via removable storage drive 616. As will be appreciated, removable storage unit 618 may include a computer usable storage medium having stored therein computer software and/or data.

In accordance with exemplary embodiments, secondary memory 612 may comprise other means for permitting computer programs or other instructions to be loaded into the computer system, such as removable storage unit 622 and interface 620. Examples of such removable storage unit 622 and interface 620 may include a program cartridge and cartridge interface, such as that found in video game devices, a removable memory chip, such as an EPROM, or PROM and associated socket, and other removable storage units 622 and interfaces 620 that permit software and data to be transferred from removable storage unit 622 to data processing system 600.

Furthermore, the data processing system 600 may comprise a communications interface 624. Communications interface 624 may permit software and data to be transferred between the data processing system and any other external devices. Examples of communications interface 624 may include a modem, a network interface, such as an Ethernet card, a communications port, a PCMCIA slot and card, etc. Software and data transferred via communications interface 624 are typically in the form of signals which may be, for example, electronic, electromagnetic, optical, or other signals capable of being received by communications interface 624. These signals may be provided to communications interface 624 via communications path (i.e., communications channel) 626. Communication path 626 may carry signals and may be implemented via wire or cable, fiber optics, a phone line, a cellular phone link, an RF link, and/or other communications channels.

The terms "computer program medium," "computer usable medium," and "computer readable medium" are used to generally refer to media such as main memory 606 and secondary memory 612, removable storage drive 616, a hard disk installed in hard disk drive 614, and signals thereof. Computer program products provide software to the computer system. The computer readable medium may enable the computer system to read data, instructions, messages or message packets, and other computer readable information from the computer readable medium. The computer readable medium, for example, may include non-volatile memory, such as Floppy, ROM, Flash memory, Disk drive memory, CD-ROM, and other permanent storage. It can be used, for example, to transport information, such as data and computer instructions, between computer systems. Furthermore, the computer readable medium may comprise computer readable information in a transitory state medium such as a network link and/or a network interface, including a wired network or a wireless network, which may enable a computer to read such computer readable information.

Computer programs, also called computer control logic, may be stored in main memory 606 and/or secondary memory 612. Computer programs also may be received via communications interface 624. Such computer programs, when executed, can enable the computer system to perform the features of exemplary embodiments as discussed herein. In particular, computer programs, when executed, may enable processor 604 to perform the features of the data processing system 600. Accordingly, such computer programs represent controllers of the data processing system.

The exemplary embodiments described herein pertain to methods that may be implemented as sets of instructions or software readable by a device. Further, it is understood that the specific order or hierarchy of steps in the methods disclosed are merely exemplary. Accordingly, based upon design preferences, it is understood that the specific order or hierarchy of steps in the method may be rearranged while remaining within the disclosed subject matter. The accompanying method claims present elements of the various steps in a sample order and are not meant to be limited to the specific order or hierarchy presented.

Aspects with respect to the various embodiments described herein also may be embodied in a computer program product that comprises all of the respective features enabling implementation of the methods described herein and that is able to carry out these methods when loaded in a computer system. Computer program, software program, program, or software in the present context mean any expression, in any language, code, or notation, of a set of instructions intended to cause a system having an information processing capability to perform a particular function either directly or after either or both of the following: (a) conversion to another language, code or notation; and/or (b) reproduction in a different material form.

The terminology used herein is for the purpose of describing particular embodiments only and is not intended to limit the various embodiments. As used herein, the singular forms "a", "an" and "the" are intended to include the plural forms as well, unless the context clearly indicates otherwise. The corresponding structures, features, materials, acts, and equivalents of all means or step plus function elements in the claims below are intended to include any structure, material, or act for performing the function in combination with other claimed elements as specifically claimed.

The disclosure has been presented for purposes of illustration and description but is not intended to be exhaustive or limited to the various embodiments in the form disclosed. Many modifications and variations will be apparent to those of ordinary skill in the art without departing from the scope and spirit of the various embodiments. The exemplary embodiments were chosen and described in order to best explain the principles of the various embodiments and the practical application thereof, and to enable others of ordinary skill in the art to understand the various embodiments with various modifications as are suited to the particular use contemplated.

What is claimed is:

1. A method comprising:
   upon determining that at least one first condition is true, migrating at least one first task executing on at least one first processor to at least one second processor such that the at least one second processor executes the at least one first task, wherein the at least one first task is partially bound to the at least one first processor such that the at least one first processor executes the at least one first task by default; and
   upon determining that at least one second condition is true, migrating the at least one first task back to the at least one first processor such that the at least one first processor executes the at least one first task;
   wherein the at least one first condition comprises a condition in which a native task utilization rate with respect to second tasks partially bound to and executing on the at least one second processor is less than a first threshold, and wherein the at least one second condition comprises a condition in which a foreign task utilization rate with respect to the at least one first task executing on the at least one second processor is less than a fifth threshold.

2. The method of claim 1, wherein the at least one first condition further comprises a condition in which a native task utilization rate with respect to first tasks partially bound to and executing on the at least one first processor is greater than a second threshold.

3. The method of claim 1, wherein the at least one second condition further comprises a condition in which the native task utilization rate with respect to the second tasks partially bound to and executing on the at least one second processor is greater than a third threshold.

4. The method of claim 1, wherein the at least one second condition further comprises a condition in which a native task utilization rate with respect to first tasks partially bound to and executing on the at least one first processor is less than a fourth threshold.

5. A system comprising:
   a plurality of processor groups, wherein each processor group comprises at least one processor;
   a non-transitory computer-readable medium for storing for each processor group (i) a list of native tasks, wherein each native task is partially bound to the processor group such that the at least one processor of the processor group executes the native task by default; (ii) a list of foreign tasks, wherein each foreign task is partially bound to a different processor group but migrated to the processor group such that the at least one processor of the processor group executes the foreign task; and (iii) a list of migrated tasks, wherein each migrated task is partially bound to the processor group but migrated to a different processor group such that the at least one processor of the different processor group executes the migrated task; and
   a load-balancing mechanism, wherein the load-balancing mechanism migrates at least one first task from a second processor group among the plurality of processor groups to a first processor group among the plurality of processor groups if the first processor group has a native task utilization rate that is less than a first threshold, the at least one first task being a native task of the second processor group and a foreign task of the first processor group, and wherein the load-balancing mechanism adds the at least one first task to the list of foreign tasks associated with the first processor group, adds the at least one first task to the list of migrated tasks associated with the second processor group, and removes the at least one first task from the list of native tasks associated with the second processor group.

6. The system of claim 5, further comprising a load-balancing mechanism, wherein the load-balancing mechanism migrates at least one second task from the first processor group to the second processor group if the first processor group has a foreign task utilization rate that is less than a second threshold, the at least one second task being a native task of the second processor group and a foreign task of the first processor group.

7. The system of claim 6, wherein the load balancing mechanism removes the at least one second task from the list of foreign tasks associated with the first processor group, removes the at least one second task from the list of migrated tasks associated with the second processor group, and adds the at least one second task to the list of native tasks associated with the second processor group.

8. A method comprising:
   determining whether a first task utilization rate with respect to at least one first task executing on at least one first processor is less than a first threshold, wherein the at least one first task is partially bound to the at least one first processor such that the at least one first processor executes the at least one first task by default; and upon determining that the first task utilization rate is less than the first threshold:
   prior to migrating at least one second task from at least one second processor to the at least one first processor, selecting the at least one second task, wherein, upon determining that there is no task partially bound to the at least one first processor that is currently migrated away from the at least one first processor, and upon further determining that there is a user-defined migration order, selecting the at least one second task comprises selecting at least one task in accordance with the user-defined migration order, and
   migrating the at least one second task from the at least one second processor to the at least one first processor such that the at least one first processor executes the at least one second task.

9. The method of claim 8, wherein, upon determining that there is at least one task partially bound to the at least one first processor that is currently migrated away from the at least one first processor, selecting the at least one second task comprises selecting the at least one task partially bound to the at least one first processor that is currently migrated away from the at least one first processor.

10. The method of claim 8, wherein, upon determining that there is no task partially bound to the at least one first processor that is currently migrated away from the at least one first processor, and upon further determining that there is no user-defined migration order, selecting the at least one second task comprises selecting at least one task from at least one processor having a highest native task utilization rate that is greater than a second threshold.

11. The method of claim 8, wherein the at least one second task is partially bound to the at least one second processor.

12. A method comprising:
   determining whether a second task utilization rate with respect to at least one second task executing on at least one first processor is less than a threshold, wherein the at least one first processor has at least one first task partially bound thereto such that the at least one first processor executes the at least one first task by default, and wherein the at least one second task is not partially bound to the at least one first processor; and
   upon determining that the second task utilization rate is less than the than the threshold:
   prior to migrating at least one second task from the at least one first processor to at least one second processor, selecting the at least one second task, wherein, upon determining that there is a user-defined migration order, selecting the least one second task comprises selecting at least one task in accordance with an order in reverse to the user-defined migration order, and
   migrating the at least one second task from the at least one first processor to the at least one second processor such that the at least one second processor executes the at least one second task.

13. The method of claim 12, wherein, f
   upon determining that there is no user-defined migration order, selecting the at least one second task comprises selecting at least one task that is not among the at least one first task and that is partially bound to at least one processor having a lowest native task utilization rate.

14. The method of claim 12, wherein the at least one second task is partially bound to the at least one second processor.

* * * * *